United States Patent [19]

Plyler

[11] Patent Number: 5,211,131
[45] Date of Patent: May 18, 1993

[54] PET GROOMING DEVICE WITH DETACHABLE HEAD

[76] Inventor: Chun A. K. Plyler, 1215 E. 10th St. #9, Roanoke Rapids, N.C. 27870

[21] Appl. No.: 987,691

[22] Filed: Dec. 9, 1992

[51] Int. Cl.⁵ ............................................. A01K 13/00
[52] U.S. Cl. .......................................... 119/87; 15/347
[58] Field of Search ................... 119/87, 83, 85, 156; 15/352, 347, 344; 132/271, 212, 219, 119.1; 34/99, 100, 96; 128/393

[56] References Cited

U.S. PATENT DOCUMENTS

| | | | |
|---|---|---|---|
| 3,308,500 | 3/1967 | Woodruff | 119/85 |
| 3,626,546 | 12/1971 | Dove | 119/85 X |
| 4,380,845 | 4/1983 | Miller et al. | 15/347 X |
| 4,799,460 | 1/1989 | Kuhl | 119/85 |
| 5,067,444 | 11/1991 | Parker | 119/85 |
| 5,095,853 | 3/1992 | Kruger | 119/85 |

Primary Examiner—Gene Mancene
Assistant Examiner—Thomas Price
Attorney, Agent, or Firm—Rhodes, Coats & Bennett

[57] ABSTRACT

The present invention relates to a pet grooming device that includes a vacuum system for inducing fleas, ticks, loose hair and other debris from an animal such as a cat or dog during a grooming exercise. The grooming device includes a detachable head having a front side that has a plurality of individually spaced bristles that project from the front of the grooming head and which act to massage and stimulate the hair and skin of an animal during the grooming process. Provided with the grooming device of the present invention is an auxiliary combing head that is attachable to the grooming device.

5 Claims, 2 Drawing Sheets

PET GROOMING DEVICE WITH DETACHABLE HEAD

FIELD OF THE INVENTION

The present invention relates to animal grooming devices and more particularly to a vacuum-type animal grooming device for sucking fleas, ticks, loose hair, other debris and the like from an animal during a grooming process.

BACKGROUND OF THE INVENTION

Pet grooming devices are known in the prior art and these pet grooming devices range from the simple to the complex. In particular, a review of prior art and commercially available pet grooming devices show that there are a wide range of hand-held grooming and comb-type products. For example, one is referred to the following U.S. Pat. Nos.: Des. U.S. Pat. No. 307,067; 4,599,823; 4,947,799; and 5,072,746. However, the pet grooming devices of the prior art and those commercially available today have numerous drawbacks and disadvantages One of the principal drawbacks and disadvantages of pet grooming devices known today is that they are not effective in removing and containing fleas, ticks and the like from the animal. Very little good is done by simply combing or brushing fleas from a dog for example. Fleas that fall upon the floor or upon upholstered furniture still tend to multiply and often are found on people that come in contact with the pet or live in a home where the pet is housed.

Therefore, there is a real need for a pet grooming device that will efficiently remove fleas, ticks, loose hair and the like from animals and which will safely control and contain the removed ticks and fleas and the like once such has been removed from the animal.

SUMMARY AND OBJECTS OF THE INVENTION

The present invention entails a pet grooming device that includes a vacuum unit for inducing fleas, ticks, loose hair and other debris from the skin or hair of the animal being groomed. In particular, the pet grooming device includes a compact and lightweight hand-held grooming device that includes a vacuum generating motor that is operative to induce a system of air through a detachable grooming head and on through a vacuum compartment that includes a collection bag for collecting the fleas, ticks, loose hair and other dust and debris that may be found on an animal. The detachable grooming head includes outer or front sides that includes a plurality of individual bristles that are uniformly spaced thereabout for engaging the hair and skin of the animal being groomed. The vacuum compartment that houses the collection bag includes an access opening that permits easy and convenient access to the vacuum compartment and to a bag contained therein. Moreover, the same vacuum compartment includes a see-through window that permits visual inspection of the vacuum compartment.

It is therefore an object of the present invention to provide a pet grooming device that will efficiently remove fleas, ticks, loose hair, dust, dirt, and other debris from the animal during the grooming process.

Still a further object of the present invention is to provide a pet grooming device of the character referred to above wherein there is provided a see-through window formed in the vacuum Compartment such that one may visually inspect the collection bag therein.

Another object of the present invention resides in the provision of the pet grooming device of the character referred to above that includes a collection bag that can be secured in such a fashion that fleas, ticks, loose hair and the like can be discarded in a sealed or tightly secured collection bag that prevents the fleas, ticks, loose hair, etc., from escaping.

Still a further object of the present invention is to provide a pet grooming device of the character referred to above which includes a detachable head that can be easily and conveniently removed from the pet grooming device.

Another object of the present invention resides in the provision of an interchangeable grooming head for a pet grooming device wherein one of the interchangeable heads includes a comb structure while the other grooming head includes a series of individually spaced bristles.

Another object of the present invention resides in the provision of a pet grooming device that has both a coarse comb head and a fine comb head which are interchangeable.

Still a further object of the present invention resides in the provision of a pet grooming device of the character referred to above that can be powered by batteries or household electricity.

Still a further object of the present invention is to provide a pet grooming device of the type described above that is simple in construction and design, reliable, easy to use and easy to handle.

Other objects and advantages of the present invention will become apparent and obvious from a study of the following description and the accompanying drawings which are merely illustrative of such invention.

DETAILED DESCRIPTION OF THE INVENTION

Figures 1, 2:
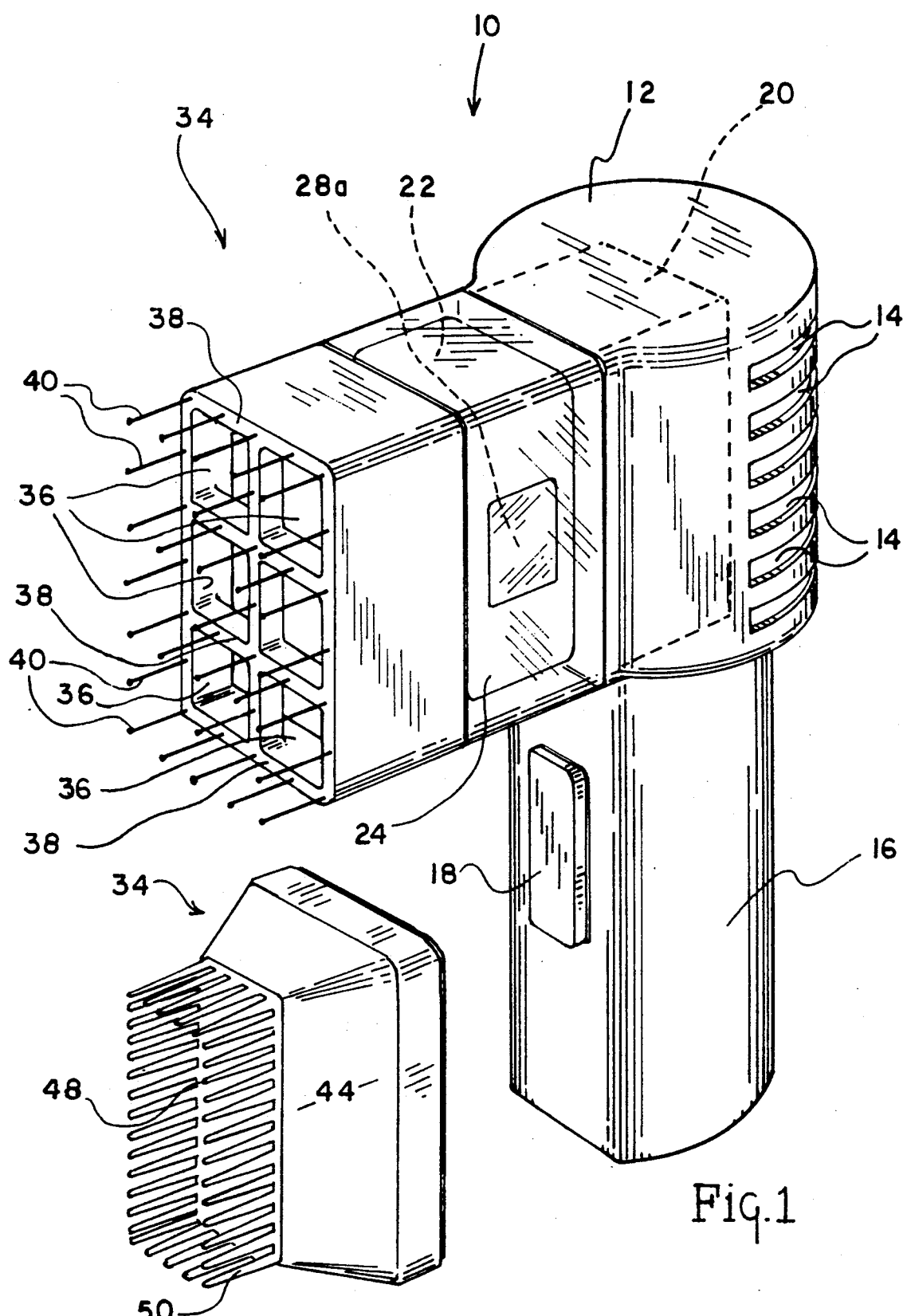
FIG. 1 is a perspective view of the pet grooming device of the present invention.
FIG. 2 is a perspective view of an attachable and detachable comb head for the pet grooming device.
Figures 3, 4:
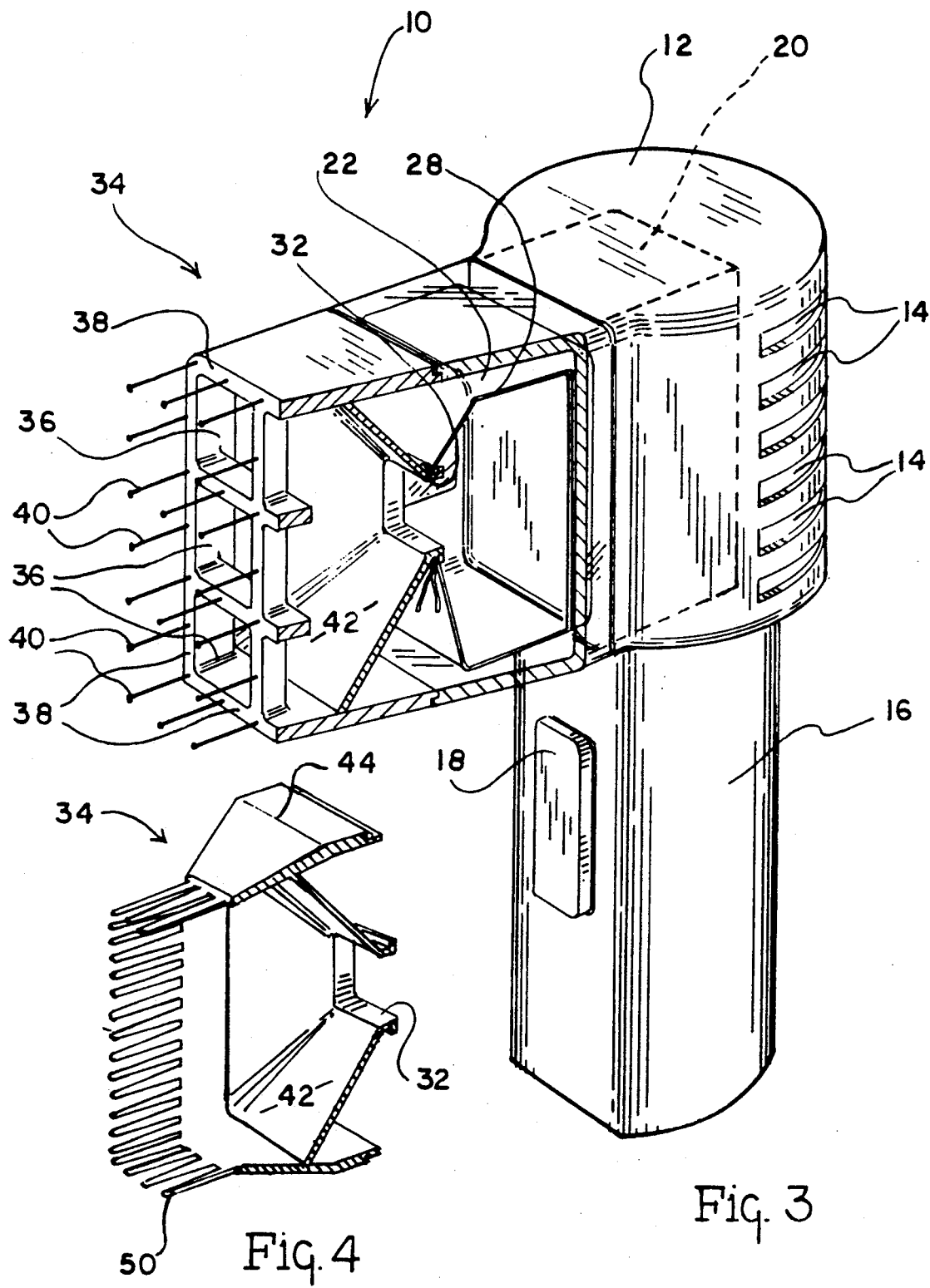
FIG. 3 is a cross-sectional view of the pet grooming device showing the internal structure of the same.
FIG. 4 is a cross-sectional view of the combing head shown in FIG. 2.

With further reference to the drawings, the pet grooming device of the present invention is shown therein and indicated generally by the numeral 10. The pet grooming device 10 includes a main body which comprises a motor housing 12. Formed in the rear of the motor housing 12 is a series of spaced apart vents 14 that permits air to be exhausted therefrom.

Integrally formed with the lower portion of the motor housing 12 is a handle 16 that depends downwardly therefrom. The handle includes switch 18 for turning a motor 20 "on" and "off". The motor 20 is disposed internally within the motor housing 12 and functions to generate a vacuum and a system of air that is pulled through the pet grooming device. Details of the air flow will be discussed in subsequent portions of this disclosure.

Formed adjacent the motor housing 12 is a vacuum compartment 22. Vacuum compartment 22 serves to house and hold an air porous-type collection bag 28 which is disposed within the vacuum compartment and which is particularly situated in the vacuum compartment such that air passing through the pet grooming device is constrained to move through the collection bag 28. Collection bag 28 also includes one or more see-through panels 28a formed therein. As will be understood from subsequent portions of this disclosure the collection bag 28 functions to collect fleas, ticks, loose hair, dust and other matter from the animal being groomed. The vacuum compartment 22 also includes a see-through access door 24 that Can be opened and closed and which permits an individual using the grooming device 10 of the present invention to gain quick and easy access to the interior of the vacuum compartment such that the collection bag 28 can be easily and conveniently removed. Separating the vacuum compartment 22 and the motor housing 12 is a perforated wall that permits a continuous stream of air to pass from the vacuum compartment 22 to and through the motor housing 12.

Secured to the front side of the vacuum compartment 22 is a detachable grooming head indicated generally by the numeral 34. In FIG. 1, the grooming head is provided with a series of open manifolds 36 that extend from the front of the grooming head 34. In the case of the design illustrated in FIG. 1, there is shown six distinct and separate passageways or manifolds 36. It is appreciated that the number and size of the manifolds may vary depending upon application.

As shown in the drawings, the detachable grooming head 34 shown in FIG. 1 includes a front edge 38 that simply forms a plain flat perimeter that encircles the inlet side of all the manifolds 36. Grooming head 34 also includes a back side which in conventional fashion snaps on and attaches to the front edge or side of the vacuum compartment 22.

Secured to the front edge 38 of the grooming head 34 is a plurality of individually spaced bristles 40. It should be noted that these individual bristles are generally uniformly spaced and essentially align the edge perimeter 38 that extends around the inlet side of each of the manifolds 36. Bristles 40 are thin and elongated and are at least slightly flexible. In addition, each of the bristles includes a tiny ball-like outer tip end. This will avoid irritating the animal's sensitive skin areas during grooming.

During the process of grooming an animal with pet grooming device 10 of the present invention, these bristles 40 are rubbed through the animal's hair and against the skin and serves to groom and agitate the hair and skin of the animal. This results in fleas, ticks, loose hair, dirt and other debris being separated from the animal and broken loose such that the system of air being generated by the vacuum motor 20 is effected to pick up and entrain the fleas, ticks, loose hair, etc., within the air stream such that the matter collected is conveyed via the air stream through the manifolds 36 into the collection bag 28.

It should be appreciated that the grooming head 34 includes a rearward converging wall 42 that directs the entire air flow entering the inlet or front side of the grooming head 34 into a bag mouth 32 that is formed about the rear end of the converging wall 42. This essentially means that all manifolds 36 terminate with the converging wall 42 such that the air passing through the grooming head is funneled inwardly to a central area and directed into the bag mouth 32 where the same air and any collected debris carried thereby is passed through the collection bag 28 which effectively strips the fleas, ticks and other debris from the air stream and collects the same in the collection bag 28.

Bag mouth 32 formed about the rear of the grooming head 34 functions to receive the top open portion of the collection bag 28. By providing an elastic member connector (such as a rubber band) or the like it is appreciated that the open portion of the bag 28 can be tightly secured around the bag mouth 32 such that air passing through the pet grooming device is constrained to enter the open top of the collection bag 28. Also, it is appreciated that this design enables the collection bag 28 to be quickly and easily mounted and disconnected from the bag mouth 32.

The pet grooming device 10 of the present invention in a preferred design would be provided with a number of grooming heads. In this regard, in FIG. 2, there is shown therein a comb-type grooming head that is indicated generally by the numeral 34. This comb-type grooming head 34 includes a comb housing 44 that includes a rear opening that forms the bag mouth 32 and a front opening 48. It is appreciated from the drawings that the front opening 48 is smaller than the bag mouth 32 and that the bag mouth 32 is adapted to quickly and easily attach to the front side of the vacuum compartment 22. Extending around the entire parameter of the front opening 48 is a series of comb teeth 50. It is appreciated that the respective comb teeth 50 can be of various coarseness, from coarse to fine. The comb-type grooming head 34, as shown in FIG. 2, can be utilized to comb and brush the hair of an animal as well as to stimulate the skin or scalp of an animal during a grooming process.

It is important to appreciate that the grooming device 10 of the present invention enables the collection bag 28 to be closed and sealed or tightly secured such that any fleas, ticks, loose hair or the like that are gathered therein are trapped and do not escape from the collection bag 28 once the collection bag has been discarded. Therefore, in one contemplated design the collection bag 28 would have a drawstring type open top. By pulling the drawstring the entire collection bag can be closed and generally sealed for safe and appropriate discarding.

In operation, the vacuum motor 20 generates a strong flowing system of air that passes into the inlet side of the grooming head 34 and once in the grooming head 34 the system of air is converged to the bag mouth 32 that directs the same system of air into the collection bag 28. As the air is passed through the air porous collection bag the bag collects and strips from the air stream fleas, ticks, loose hair, dust, dirt, debris, etc. Air passing from the collection bag 28 passes through the perforated wall 30 separating the vacuum compartment and the motor housing 12.

As pointed out above, the collection bag 28 can be easily and conveniently removed from the vacuum compartment 22 by simply opening the access door 24 and removing the bag. Prior to removing the bag, one can visually inspect the bag 28 by viewing the same through the see-through window 26 and the see-through window.

From the foregoing specification and discussion, it is appreciated that the present invention has many advantages over the prior art devices in that the pet grooming device 10 positively draws and removes fleas, ticks, loose hair, dirt and debris from the animal during the grooming process. The present invention will efficiently remove fleas, ticks, loose hair, dirt and other debris inasmuch as the vacuum motor can generate a substantial vacuum at the inlet side of the grooming head 34.

Also, it is appreciated that the pet grooming device 10 is simple, compact and easy to use as well as being durable and reliable.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended Claims are intended to be embraced therein.

Claim:

1. A pet grooming device for removing fleas, ticks, loose hair and other debris from a pet comprising: a motor housing having a power source located therein for generating a vacuum; a vacuum compartment disposed adjacent the motor housing and including a collecting bag for collecting fleas, ticks, loose hair and debris and the like, a grooming head secured to the vacuum compartment and including a front and back side and a plurality of separate and distinct manifolds; means associated with the grooming head for detachably connecting the same to the vacuum compartment of the pet grooming device; a handle secured to the pet grooming device and depending therefrom such that an individual using the pet grooming device may grip and hold the handle; and a series of generally uniformly spaced individually grooming bristles formed on the front side of the grooming head and projecting outwardly therefrom for engaging the pet, and wherein the front side of the grooming head includes an exposed surrounding edge that extends around the respective manifolds formed about the front side of the grooming head and wherein the respective grooming bristles are formed continuously and generally uniformly about the surrounding edge of the front side of the grooming head, the vacuum compartment includes a see-through area that enables one to visually inspect the collecting bag contained therein, the see-through area further includes a see-through area formed in the collection bag itself.

2. The pet grooming device of claim 1 including an attachable combing head that is adapted to be readily attached to the vacuum compartment and wherein the combing head comprises a tapered housing having a relatively large back opening and a relatively small front opening with the back opening being adapted to connect directly to the vacuum compartment; and wherein there is provided a series of comb teeth secured about the periphery of the front relatively small opening and extending continuously therearound with each of the series of comb teeth projecting outwardly therefrom.

3. The pet grooming device of claim 2 wherein including a pair of combing heads, one having coarse combs and the other having fine combs.

4. The pet grooming device of claim 1 further including an access door formed in the vacuum compartment that enables one to gain quick and easy access to the vacuum compartment and to the debris collecting bag disposed therein.

5. The pet grooming device of claim 1 wherein the grooming head, vacuum compartment, and motor housing are all aligned such that air is induced in the front side of the grooming head and passes through the respective manifolds and into and through the debris collection bag contained within the vacuum compartment and finally is exhausted out exhaust vents formed in the motor housing.

* * * * *